US008091963B2

(12) United States Patent
Wyner et al.

(10) Patent No.: US 8,091,963 B2
(45) Date of Patent: Jan. 10, 2012

(54) CUSHIONING MEDALLIONS, METHODS OF MAKING AND METHODS OF USING

(75) Inventors: Daniel M. Wyner, North Scituate, RI (US); Thomas F. Cafaro, Foster, RI (US); Richard B. Fox, Smithfield, RI (US); Jeffrey H. Bowie, Chepachet, RI (US)

(73) Assignee: G-Form, LLC, Providence, RI (US)

( * ) Notice: Subject to any disclaimer, the term of this patent is extended or adjusted under 35 U.S.C. 154(b) by 0 days.

(21) Appl. No.: 13/155,664

(22) Filed: Jun. 8, 2011

(65) Prior Publication Data

US 2011/0233973 A1 Sep. 29, 2011

Related U.S. Application Data

(63) Continuation of application No. 12/102,829, filed on Apr. 14, 2008, now abandoned.

(60) Provisional application No. 60/923,294, filed on Apr. 13, 2007, provisional application No. 60/923,295, filed on Apr. 13, 2007.

(51) Int. Cl.
*B62J 1/18* (2006.01)

(52) U.S. Cl. .......................................................... 297/214

(58) Field of Classification Search .................. 297/214
See application file for complete search history.

(56) References Cited

U.S. PATENT DOCUMENTS

| | | | |
|---|---|---|---|
| 1,625,582 | A | 4/1927 | Anderson |
| 2,449,373 | A | 12/1944 | Falge |
| 2,631,407 | A | 3/1953 | Rempel |
| 2,668,394 | A | 2/1954 | Auzin |
| 2,960,794 | A | 11/1960 | Johns |
| 3,982,335 | A | 9/1976 | Cunningham |
| 4,009,298 | A | 2/1977 | Cavanagh |
| 4,168,754 | A | 9/1979 | Nyholm |
| 4,240,224 | A | 12/1980 | Katzman |
| 4,381,579 | A | 5/1983 | Rumpp |
| 4,415,954 | A | 11/1983 | Schaefer |
| 4,416,166 | A | 11/1983 | Jannard |
| 4,429,915 | A | 2/1984 | Flager |
| 4,476,742 | A | 10/1984 | Midgley |
| 4,552,944 | A | 11/1985 | Kamiyama et al. |
| 4,611,851 | A | 9/1986 | Noyes |
| 4,683,671 | A | 8/1987 | Farrar |
| 4,722,946 | A | 2/1988 | Hostettler |
| 4,794,658 | A | 1/1989 | Goodale |
| 4,842,332 | A | 6/1989 | Conner, Jr. |
| 4,952,439 | A | 8/1990 | Hanson |
| 4,956,932 | A | 9/1990 | Cupp |
| 4,998,367 | A | 3/1991 | Leibowitz |

(Continued)

FOREIGN PATENT DOCUMENTS

JP 05-339399 12/1993

(Continued)

OTHER PUBLICATIONS

Teknor Apex "Monprene", www.teknorapex.com.

(Continued)

*Primary Examiner* — Sarah B McPartlin
(74) *Attorney, Agent, or Firm* — Bowditch & Dewey, LLP

(57) ABSTRACT

The present disclosure relates to cushioning medallions, methods of making and methods of using, particularly cushioning medallions comprising a relatively low durometer viscoelastic polymer gel, for use on a bicycle seat.

11 Claims, 13 Drawing Sheets

10' 14 10'a A 12 14 10'a B 12 12b 10b 16 16a

U.S. PATENT DOCUMENTS 5,108,076 A 4/1992 Chiarella
5,143,390 A 9/1992 Goldsmith
5,144,708 A 9/1992 Pekar
5,163,646 A 11/1992 Engelhardt
5,203,607 A 4/1993 Landi
5,233,845 A 8/1993 D'Andrade
5,238,244 A 8/1993 Cotter
5,267,487 A 12/1993 Falco
5,280,993 A 1/1994 Hsh
5,318,344 A 6/1994 Wang
5,330,249 A 7/1994 Weber
5,335,382 A 8/1994 Huang
5,356,099 A 10/1994 Sereboff
5,390,467 A 2/1995 Shuert
5,419,612 A 5/1995 Rassekhi
5,419,730 A 5/1995 Diresta
5,420,381 A 5/1995 Gardner, Jr.
5,435,508 A 7/1995 Deuitch
5,445,349 A 8/1995 Hart
5,476,491 A 12/1995 Mayn
5,547,154 A 8/1996 Kirchhoff
5,568,907 A 10/1996 Wolfe
5,601,264 A 2/1997 Peart
5,634,685 A 6/1997 Herring
5,701,623 A 12/1997 May
5,704,905 A 1/1998 Jensen et al.
5,709,870 A 1/1998 Yoshimura
5,720,518 A 2/1998 Harrison
5,766,704 A 6/1998 Allen
5,829,073 A 11/1998 Lee
5,846,063 A 12/1998 Lakic
5,865,180 A 2/1999 Sigfrid
5,904,396 A 5/1999 Yates
5,921,840 A 7/1999 Diresta
5,932,046 A 8/1999 Yates
5,938,277 A 8/1999 Rioux
5,975,629 A 11/1999 Lorbiecki
5,980,143 A 11/1999 Bayer
6,007,149 A 12/1999 Yates
6,012,772 A 1/2000 Conde
6,012,997 A 1/2000 Mason
6,030,035 A 2/2000 Yates
6,076,784 A 6/2000 Selker
6,093,468 A 7/2000 Toms et al.
6,108,869 A 8/2000 Meessmann
6,135,550 A 10/2000 Tucho
6,153,277 A 11/2000 Chang
6,171,091 B1 1/2001 Bettencourt
6,305,115 B1 10/2001 Cook
6,305,743 B1 10/2001 Wheeler
6,311,423 B1 11/2001 Graham
6,390,548 B1 5/2002 Cole
6,422,647 B1 7/2002 Turudich
6,425,194 B1 7/2002 Brie
6,445,378 B1 9/2002 Flagg
6,450,906 B1 9/2002 Touhey
6,467,212 B1 10/2002 Apel
6,499,703 B2 12/2002 Chou
6,546,583 B1 4/2003 Rohrig
6,588,023 B1 7/2003 Wright
6,594,935 B2 7/2003 Beretta
6,601,272 B2 8/2003 Stvartak
6,631,568 B2 10/2003 Howlett
6,643,875 B2 11/2003 Boso
6,698,510 B2 3/2004 Serra
6,705,026 B1 3/2004 Arbour
6,797,765 B2 9/2004 Pearce
6,802,140 B2 10/2004 Aslanides
6,834,456 B2 12/2004 Murello
6,880,269 B2 4/2005 Falone et al.
6,893,366 B2 5/2005 Falone et al.
6,922,862 B1 8/2005 Thompson
6,944,974 B2 9/2005 Falone et al.
7,037,571 B2 5/2006 Fish et al.
7,114,783 B2 10/2006 Warren
7,159,342 B2 1/2007 Grisoni et al.
7,183,523 B2 2/2007 Lu
7,261,525 B2 8/2007 Pekar
7,264,533 B2 9/2007 Chan et al.
7,424,760 B2 9/2008 Chaffee
7,448,676 B2 11/2008 Wyner et al.
2002/0192452 A1 12/2002 Harrison
2003/0044313 A1 3/2003 Lee
2003/0070259 A1 4/2003 Brown et al.
2003/0106132 A1 6/2003 Terris
2003/0132359 A1 7/2003 Brophy
2003/0135943 A1 7/2003 Meyer
2003/0154567 A1 8/2003 Drossler et al.
2003/0161999 A1 8/2003 Kannankeril
2004/0048688 A1 3/2004 Hogge
2004/0144011 A1 7/2004 Vignaroli
2004/0154133 A1 8/2004 Polzin
2005/0101693 A1 5/2005 Arbogast
2006/0010608 A1 1/2006 DeFranks et al.
2006/0168710 A1 8/2006 Vito
2006/0182787 A1 8/2006 Jaenichen et al.
2006/0230643 A1 10/2006 Affleck
2006/0254088 A1 11/2006 McCormick
2006/0277801 A1 12/2006 Schwarze et al.
2006/0277950 A1 12/2006 Rock
2007/0061978 A1 3/2007 Losio
2007/0072712 A1 3/2007 Chernick
2007/0113317 A1 5/2007 Garneau
2007/0199155 A1 8/2007 Thygsen
2007/0226911 A1 10/2007 Gladney
2007/0261274 A1 11/2007 Fox
2008/0010861 A1 1/2008 Kosmas
2008/0034614 A1 2/2008 Fox et al.
2008/0222918 A1 9/2008 Hesse
2008/0299163 A1 12/2008 Haskin et al.
2009/0029147 A1 1/2009 Tang et al.
2009/0090028 A1 4/2009 Moramarco et al.
2009/0255625 A1 10/2009 Fox et al.
2010/0005595 A1 1/2010 Gladney et al.
2010/0159192 A1 6/2010 Cotton

FOREIGN PATENT DOCUMENTS

WO WO 97/26821 7/1997
WO WO 2005/004658 1/2005
WO WO 2005/004936 1/2005
WO WO 2007/092091 8/2007

OTHER PUBLICATIONS

Electronic Products, "Gap-filler Pad Improves Compressibility", www.electronicproducts.com.

P
42
41
42
48
46
40
48
46
48
46
48
46
42
41
42
P
$D_1$
$D_2$
$D_1$
$D_1$
$D_2$
$D_1$
$D_1$
$D_2$
$D_1$
$D_1$
$D_2$
$D_1$
40
44

50
16
58
14
16
58
14
62
40
44
58
14
58
14
50
14

50
14
16
58
14
58
16
47
14
62
40
44
58
14
58
14
50
14

14
50
16
58
14
58
16
14
58
40
44
14
58
14
50
50
16
14

CUSHIONING MEDALLIONS, METHODS OF MAKING AND METHODS OF USING

RELATED CASES

The present application claims the benefit of U.S. Provisional Application Nos. 60/923,294 and 60/923,295, both of which were filed on Apr. 13, 2007, each of which is incorporated herein by reference in its entirety.

TECHNICAL FIELD

The present disclosure relates to cushioning medallions, methods of making and methods of using, and in particular, to bicycle seats including the medallions.

BACKGROUND

Patent and non-patent literature is replete with efforts to make bicycle seats as light and comfortable as possible, which is particularly important due to the nature and use of these seats. The comfort of a bicycle seat is at least in part a function of its shape and of the materials from which it is made. Often the addition of shock absorbing materials such as gels and foams to a seat can adversely affect its shape and weight. The lightest and sleekest seats tend to offer cyclists the least amount of cushioning and vibration absorption.

In many cases, after the purchase of a bicycle seat, cyclists find that the seat is not sufficiently cushioned, or is in some other way uncomfortable. There are many examples of bicycle seats with different designs, shapes, and cushioning, but surprisingly few options for a cyclist that would like to add additional cushioning to an existing seat. One method for adjusting the comfort of an existing seat is to use an "add-on" seat cover, which may include an upper layer of cushioning, such as a gel, surrounded by a skirt or fastening system by which the cover can be fastened to an existing seat. Because add-on seat covers may cover the entire top surface of the bicycle seat, they are generally fairly bulky and interfere with the sleek aesthetics that many cyclists find desirable.

Thus, there is a need for improved and customized cushioning for bicycle seats. In addition, there is a need for a method of applying cushioning in selective areas to customize or fine-tune the shape and feel of a seat to a particular cyclist. Also, there is a need for a method of improving the cushioning of a bicycle seat without negatively impacting its shape or look.

SUMMARY

Disclosed herein is bicycle seat cushioning system, comprising a first cushioning medallion and a second cushioning medallion, each of the first and second cushioning medallions comprising a thermoplastic elastomeric (TPE) barrier layer, a polymerized gel layer, and a removable stabilizing layer disposed adjacent to the polymerized gel layer and opposite the barrier layer, and a pressure sensitive adhesive disposed between the polymerized gel layer and the stabilizing layer; wherein the first and second cushioning medallions are constructed and arranged to be disposed in spaced apart relation on the bicycle seat.

The above described and other features are exemplified by the following figures and detailed description.

BRIEF DESCRIPTION OF THE DRAWINGS

Referring now to the figures, which are exemplary embodiments, and wherein like elements are numbered alike.

DETAILED DESCRIPTION

Figure 1:
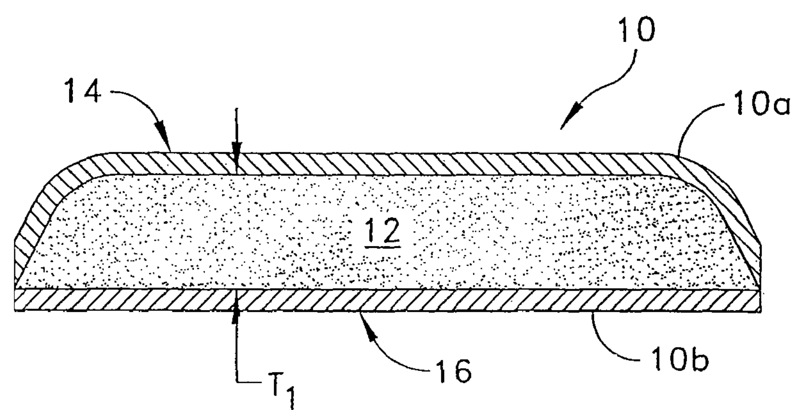
FIG. 1 is a schematic side view of an exemplary seat medallion according to the present disclosure.

The present disclosure is directed to relatively low durometer gel medallions that can be applied to a surface, such as the surface of a bicycle seat, to provide improved cushioning, shock absorption and/or vibration dampening, and/or to adjust the shape of cushioning in selected regions of the seat. In addition, the present medallions allows cyclists to add cushioning in selected shapes and regions to customize the seat as desired. By allowing cyclists to apply additional cushioning in selected shapes and regions, the present medallions not only provide a convenient method of adding additional cushioning to an existing seat, but also provide a level of customization of seat cushioning that has not yet been available.

In some embodiments of the present medallions, it may be highly desirable to create shapes by which cyclists can elevate the contact points on an existing seat to lift the cyclist, thereby relieving pressure on sensitive areas, to change the contact points to the seat if the existing contact points are uncomfortable, or both.

In another embodiment, the present disclosure, medallions can be combined by nesting and/or stacking to provide still further customization for the cyclist.

The adhesively applied cushioning medallions in the present disclosure can be fabricated in a variety of shapes, sizes, configuration and colors and materials so as to improve the comfort of the seat, but at the same time maintain a desirable aesthetic of the seat.

The present medallions allow cyclists who are unhappy with an existing seat, to modify and improve the cushioning of the seat. Additionally, the medallions may be applied to a seat mid-way through a long ride, to change the contact points of the seat, as almost any contact point may become uncomfortable over time. The present medallions provide additional gel or padding for an existing saddle, without completely covering the upper surface of the saddle, which is aesthetically unappealing. In addition, the present medallions provide a high level of customization and fine-tuning to any bicycle seat. Through a selection of appropriate shapes and aesthetics of the applied cushioning, the cyclist can create a more comfortable seat that has an acceptable or even improved aesthetic appearance, while maintaining the sleek shape desirable for cycling.

It should be understood that the terms “bottom” and “top,” and/or “upper” and “lower” are used herein, unless otherwise noted, merely for convenience of description, and are not limited to any one position or spatial orientation. Also, it should be understood that the terms “first,” “second,” and the like, herein do not denote any order, quantity, or importance, but rather are used to distinguish one element from another, and the terms “a” and “an” herein do not denote a limitation of quantity, but rather denote the presence of at least one of the referenced item. Further, unless defined otherwise, technical and scientific terms used herein have the same meaning as is commonly understood by one of skill in the art to which this disclosure belongs.

Figure 2:
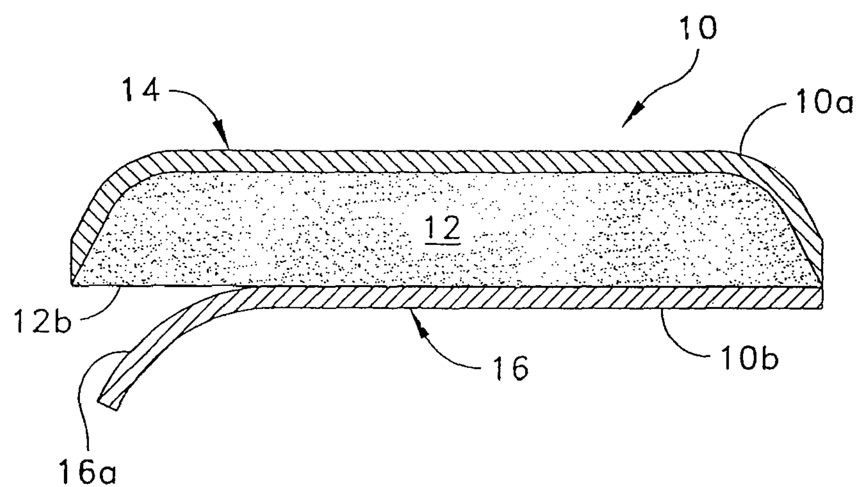
FIG. 2 is a schematic side view of the layer shown in FIG. 2, showing the method of removing the release liner.

FIGS. 1-2, when taken together, show a cross-section of an exemplary medallion 10 comprising a gel layer 12 (hereinafter “gel layer”), a barrier layer 14 disposed adjacent to the gel layer 12, and a stabilizing layer 16 disposed adjacent to gel layer 12, opposite barrier layer 14.

In the present embodiment, gel layer 12 comprises a Shore 00 hardness of about 55, and the barrier layer 14 comprises a TPU film with a thickness of about 0.75 mil. The film 14 may optionally contain an active agent such as silver to prevent the growth of microorganisms.

In the present embodiment, gel layer 12 can comprise an adhesive strength sufficient to allow it to adhere to a surface, such as the surface of a bicycle seat. Thus, stabilizing layer 16 can optionally comprise a release coating (not illustrated) such as silicone, disposed on surface 16*a*, which can assist in the manual release of stabilizing layer 16 from surface 12*b* of gel layer 12 (as shown in FIG. 2), thereby exposing surface 12*b* of gel layer 12 in order to allow it to be adhered to a surface, such as the surface of a bicycle seat.

Figure 3:
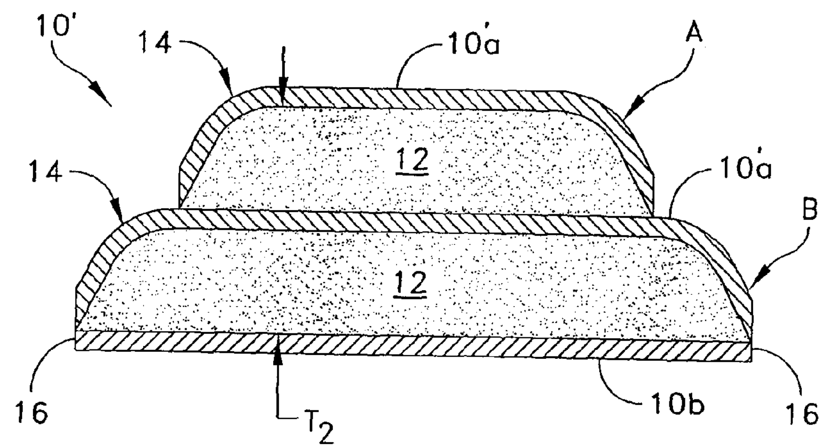
FIG. 3 is a schematic side view of an exemplary set of nested seat medallions.
Figure 4:
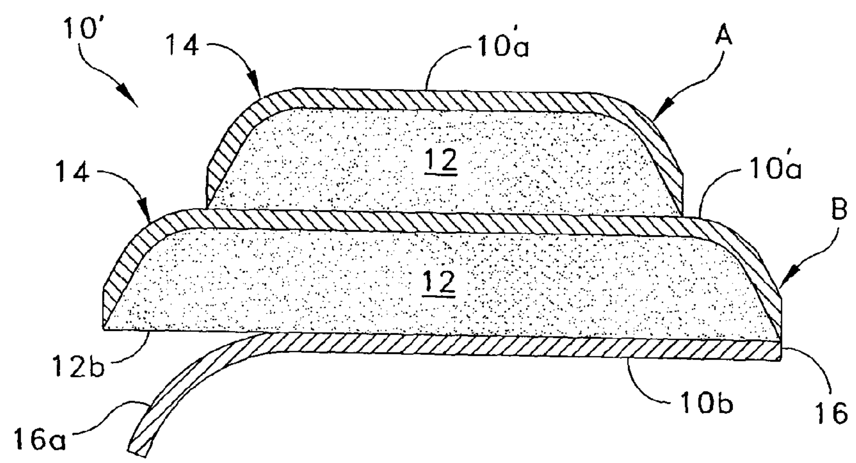
FIG. 4 is a schematic side view of the nested seat medallions shown in FIG. 3, showing the method of removing the release liner of the lower medallion A.
Figure 5:
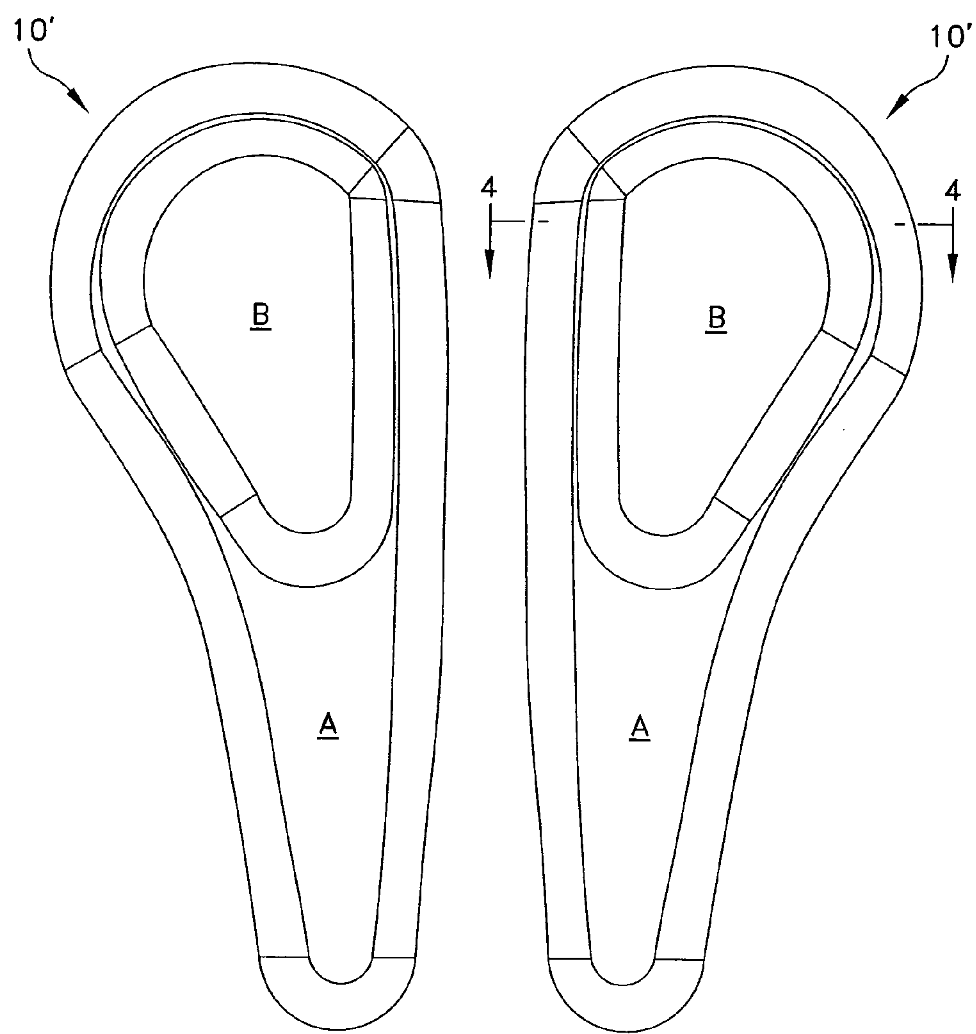
FIG. 5 is a top view of two mirror image nested seat medallions as shown in FIGS. 3 and 4.
Figure 6:
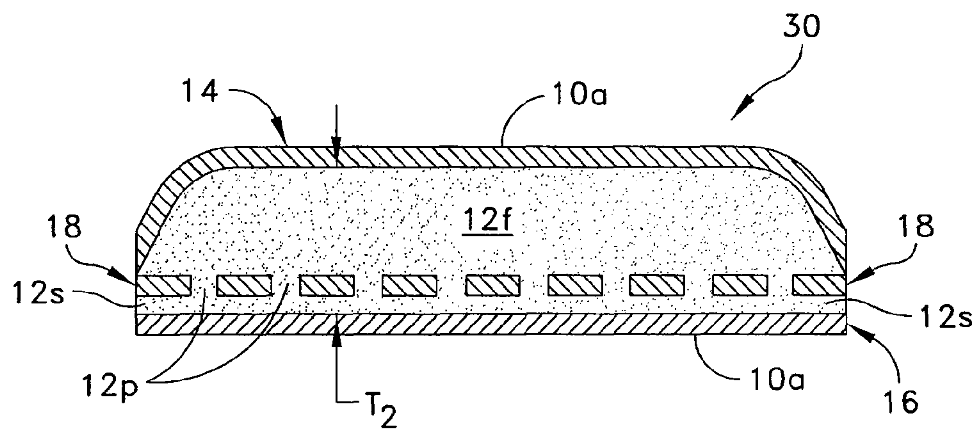
FIG. 6 is a side view of another exemplary seat medallion.

FIGS. 3, 4 and 5, when taken together, show another embodiment of a seat medallion 10' configured and dimensioned for application to a bicycle seat, each comprising the same initial structure as shown in the previous embodiment. As shown, seat medallion 10' comprises a stack of the two seat medallions, upper medallion A and lower medallion B. Seat medallion 10' can be formed, for example, by removing the stabilization layer 16 from upper medallion A and adhering the exposed gel surface 12*b* to upper surface 10*a* of lower medallion B. In use, seat medallions 10' can be adhered directly to areas of a bicycle seat where impact and vibration needs to be dampened, by removing the stabilization layer 16 from the second seat medallion B.

In use, a pair of medallions 10' can be first disposed on a bicycle seat so that the wider end of each medallion B is positioned at the rear of the seat (not illustrated). The two medallions 10' can be disposed in spaced apart relation so as to lift the sensitive areas of the cyclist off of the seat. Thereafter, medallions A can be applied to the upper surface of medallions B to create additional lift and cushion. Alternatively, the smaller medallions A can be used independently of medallions B where less cushioning and/or lift is desired. It can be readily seen how other alternative shapes or additional shapes can be designed to work either with or independently of one another.

Figure 7:
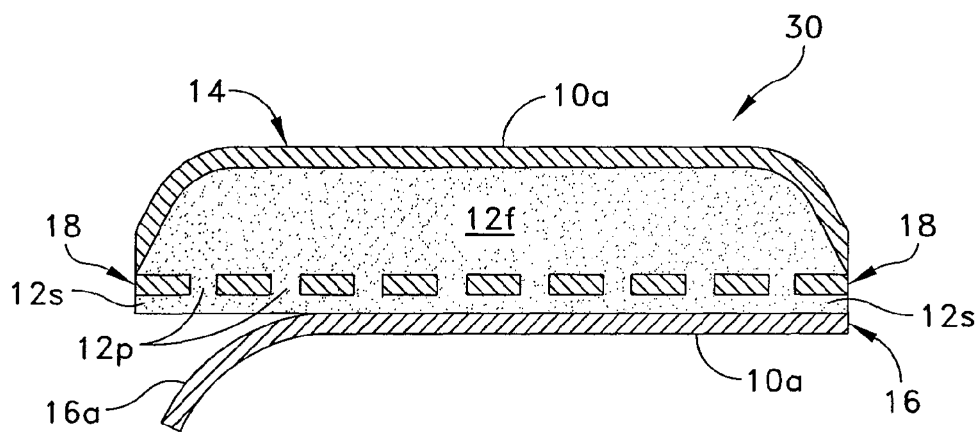
FIG. 7 is a side view of the medallion shown in FIG. 6, showing the method of removing the release liner.
Figure 8:
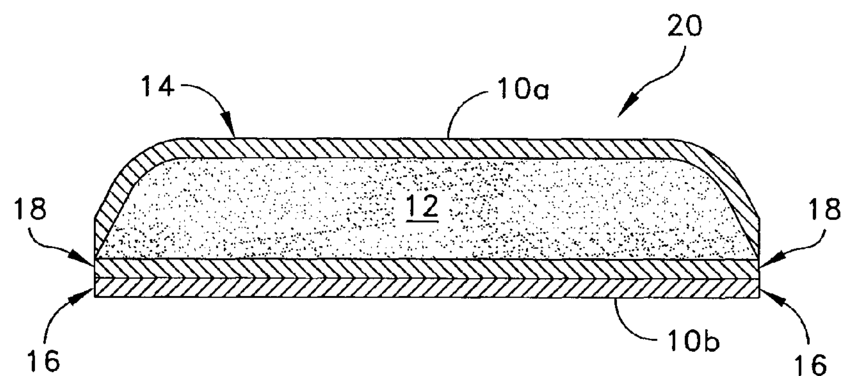
FIG. 8 is a side view of another exemplary seat medallion.

FIGS. 7-8, when taken together, show another exemplary seat medallion 30 comprising a first gel layer 12*f*, a barrier layer 14 disposed adjacent to first gel layer 12*f*, a fabric layer 18 disposed on a side of first gel layer 12*f* opposite barrier layer 14, a second gel layer 12*s* disposed adjacent to fabric layer 18 and opposite first gel layer 12*f*, and a plurality of gel portions 12*p* disposed in fabric layer 18, interconnecting first and second gel layers 12*f*, 12*s*. Optionally, a stabilization layer 16 can be disposed adjacent second gel layer 12*s* opposite first gel layer 12*f*.

In the present embodiment, fabric layer 18 can be at least partially fluid-permeable, which can allow penetration of a gel precursor through at least a portion of layer 18 (e.g., through the strands of a woven textile). Thus, during the molding process, when a gel precursor flows through layer 18 or a portion of layer 18, a tacky, adhesive surface can be formed on a side of layer 18 opposite first gel layer 12*f*, which surface can be a continuous or discontinuous layer, depending on the amount of gel precursor that flows through layer 18. Thus, in the final product, layer 18 can be sandwiched between the two gel layers 12*f*, 12*s* that are interconnected with gel portions 12*p* that extend through layer 18. It should be understood that the drawings are not to scale, and that the degree of penetration into and/or through layer 18 depends on a variety of factors including, but not limited to, the type of material, the thickness of material, the degree to which the material is fluid-permeable (e.g., the size of any pores and/or openings in layer 18, and the like), the viscosity of the gel, the molding pressure and temperature, and the like. Thus, the thickness of gel layer 12*s*, and whether layer 12*s* is continuous or discontinuous depends on the foregoing as well.

As noted above, the adhesive strength of gel layers 12*f*, 12*s* can vary, depending on a variety of factors. In one embodiment, if gel layer 12*s* has sufficient adhesive strength, it can be used to adhere the seat medallion 10 directly to a surface, such as the surface of a bicycle seat, thereby eliminating a separate adhesive. Seat medallion 10 can be disposed on the surface of a bicycle seat by peeling back and removing stabilization layer 16, exposing the adhesive gel layer 12*s*, and adhering gel layer 12*s* to the palm.

Figure 9:
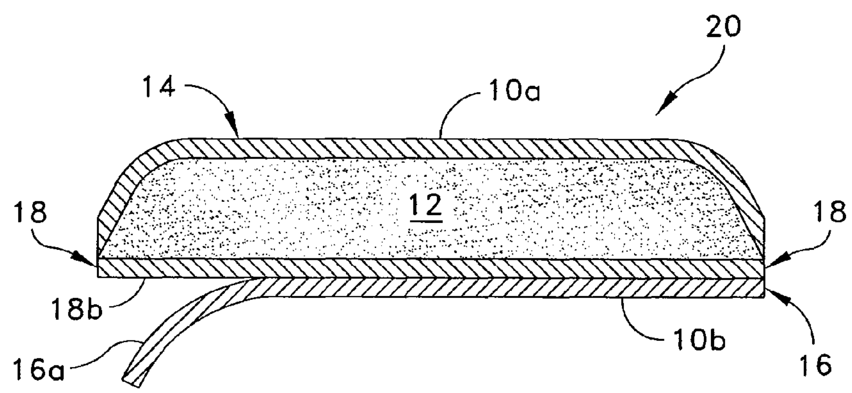
FIG. 9 is a side view of the medallion shown in FIG. 8, showing the method of removing the release liner.
Figure 10:
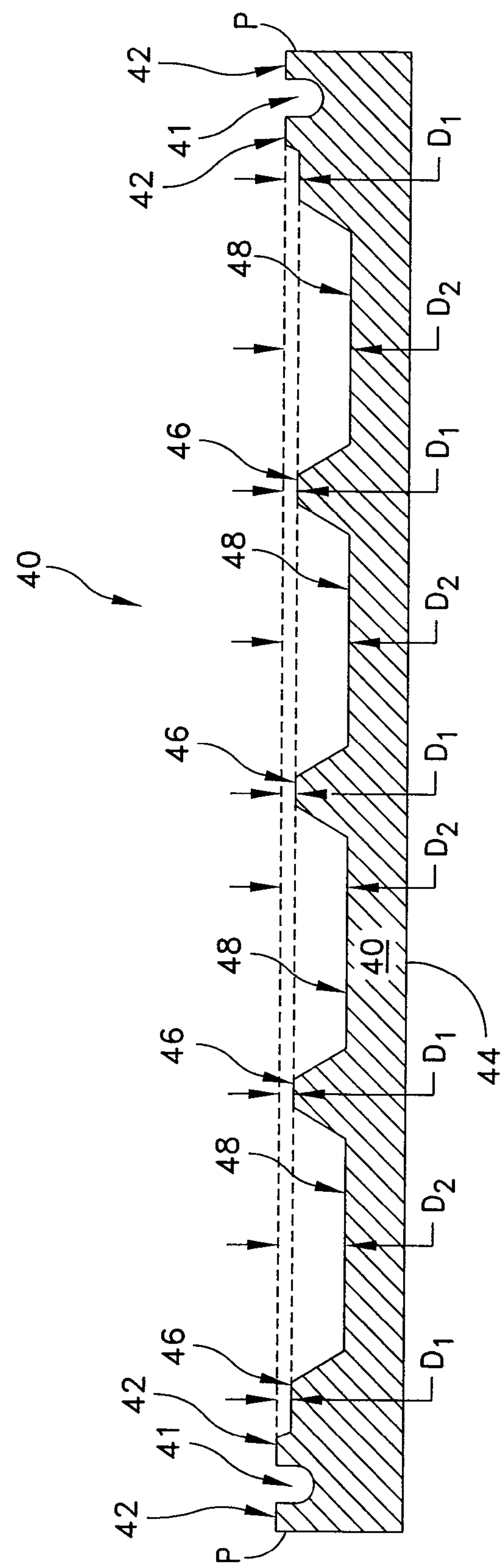
FIG. 10 is a cross-sectional schematic view of a mold that can be used in the present method.

FIGS. 9 and 10, when taken together, show another exemplary seat medallion 20 comprising a gel layer 12, a barrier layer 14 disposed adjacent to gel layer 12, a fabric layer 18 disposed on a side of gel layer 12 opposite barrier layer 14, and a stabilization layer 16 disposed adjacent to fabric layer 18 and opposite gel layer 12. If desired, an adhesive can be disposed between fabric layer 18 and stabilization layer 16.

Optionally, in any of the foregoing embodiments, an adhesive (not illustrated), such as a pressure sensitive adhesive (“PSA”), can be disposed on surface 10*b* to allow seat medallion 10 to be adhered to a surface, such as the surface of a bicycle seat. Such an option may be useful, for example, if stabilizing layer 16 does not comprise a release coating on surface 16*a*, or if the gel being used does not have sufficient adhesive properties to stick to the desired surface.

Optionally, in any of the foregoing embodiments, an adhesive can be disposed on surface 12*b* to allow seat medallion 10 to be adhered to a surface, such as a bicycle seat. Thus, stabilizing layer 16 can optionally comprise a release coating (not illustrated) such as silicone, disposed on surface 16*a*, which can assist in the manual release of stabilizing layer 16 from surface 12*b*, thereby exposing the PSA disposed on surface 128*b* in order to allow it to be adhered to a surface.

When an adhesive is used, the adhesive can be disposed on a support layer, if desired. It can also be desirable for the support layer to be flexible, which improves the conformity of the medallions to the bicycle seat. One example of such a material is available from Omniflex (product number 18411 or 18411AG), which comprises a thermoplastic polyurethane ("TPU") film, a pressure sensitive adhesive ("PSA") disposed on a side of the TPU film, and a Mylar release layer disposed adjacent to the PSA. In use, the material is disposed as a sheet on the gel precursor, and during the molding process, the TPU film can bond with the TPU gel precursor, leaving the PSA and Mylar release layer disposed on the bottom surface of the medallion. Upon removal of the Mylar release layer, the PSA is exposed, and can be applied to the bicycle seat as desired.

Optionally, in any of the foregoing embodiments, seat medallion 10 can comprise an active agent disposed in the barrier layer 14, for example, an antimicrobial agent and/or an antifungal agent, and the like. For example, barrier layer 14 can comprise an active agent such as silver, copper and/or zinc, to prevent the growth of odor causing bacteria and/or inhibit the growth of fungus so as to prevent or treat the condition of athlete's foot. One possible barrier layer 14 comprising such an active agent is Vacuflex 18411 AG, available from Omniflex, Inc.

Optionally, in any of the foregoing embodiments, the use of a colored or patterned layer 18 (e.g., a colored and/or patterned fabric layer) in combination with a transparent gel can provide what appears to be a colored or patterned gel article. This can create an article with much more color variations than would be possible with simply using colored or pigmented gel. The use of patterned fabrics or metallic sheen fabrics or other variations in the aesthetic of layer 18 can impart these aesthetics to the gel article; such aesthetics would be difficult or impossible to impart to the gel article by pigmenting the gel or printing the gel article. This process also offers a potential economic advantage to coloring or printing the gel.

In any of the foregoing embodiments, the use of a pigmented barrier layer in combination with a transparent polymeric gel layer can provide the appearance of a colored gel article. The pigmentation of the barrier layer could also be used in combination with a colored gel to provide more color depth. An example of such a pigmented film for the barrier layer (with antimicrobial silver active agent) is available from Omniflex, Inc. of Greenfield, Mass. as product number 1881 Black Polyknit AG/PU film.

In any of the foregoing embodiments, the seat medallions can comprise a total thickness $T_2$ of about ⅛ inch. However, it should be understood that any desired thickness can be achieved by stacking any number of individual seat medallions in order to achieve a desired result.

Although illustrated herein as bicycle seat medallions, it should be understood that medallions can be formed to cushion, absorb impact and dampen vibrations for other body areas as well. Such medallions can comprise any shape, size and/or configuration, and can be tailored to the specific body regions, as desired.

In another aspect of the disclosure, formation of the foregoing medallions is facilitated by various processing techniques. The methods provide a relatively inexpensive method of molding a variety of commodity products comprising various degrees of hardness. In particular, gels having relatively low durometers, such as viscoelastic gels, can be extremely tacky, making them difficult or impossible to use in commercial processing techniques such as injection molding, because the materials will adhere to the molds. In addition, such materials have relatively low durability in comparison to other materials, including other polymeric materials. Thus, applications for relatively low durometer gel materials have been limited, despite their advantageous pliability and softness characteristics. Accordingly, one aspect is a method of molding a viscoelastic gel. It should be understood that the method is not limited to polymeric materials, and that materials other than polymeric materials can be molded with the method (e.g., composite materials, and the like). Other examples suitable techniques for forming the present medallions can be found in U.S. patent application Ser. No. 11/712,729, which was filed on Feb. 28, 2007, and U.S. Provisional Application No. 61/044,859, which was filed on Apr. 14, 2008, each of which is incorporated herein by reference in its entirety.

FIGS. 10-18, when taken together, illustrate one exemplary method for forming the foregoing medallions. The present method involves selecting a suitable mold 40 for the desired product, which can comprise opposing upper and lower surfaces 42, 44. As shown, mold 40 can comprise a recessed region 46 defined in the upper surface 42 of the mold, which is recessed from the upper surface 42 by a depth "$D_1$".

The present exemplary mold 40 can comprise any number of individual mold units 48 defined in the recessed region 46, each of which corresponds to the shape and size of the desired final molded product 10, which in this instance is a seat medallion. Although illustrated herein as a seat medallion for the sake of convenience, it should be understood that a variety of products can be molded using the present method. Each of the individual mold units 48 is recessed from the upper surface 42 by a depth "$D_2$", which corresponds to the desired thickness of the final molded product 49.

Mold 40 also can comprise a gasket recess 41 disposed between the recessed region 46 and the perimeter "P" of mold 40, in which a gasket 50 can be disposed. Alternatively, gasket 50 can be disposed directly on the upper surface 42 of the mold 40. Gasket 50 can provide a seal sufficient to restrict the flow of polymer from the mold 40. Gasket 50 and/or mold 40 can comprise periodic openings 52 to allow entrapped air to flow out of mold 40 during the molding process. For example, as shown, gasket 50 can comprise openings 52 (not illustrated). Optionally, mold 40 can comprise one or more registration guides 54 (not illustrated), for example, pins, studs, and the like.

Figure 11:
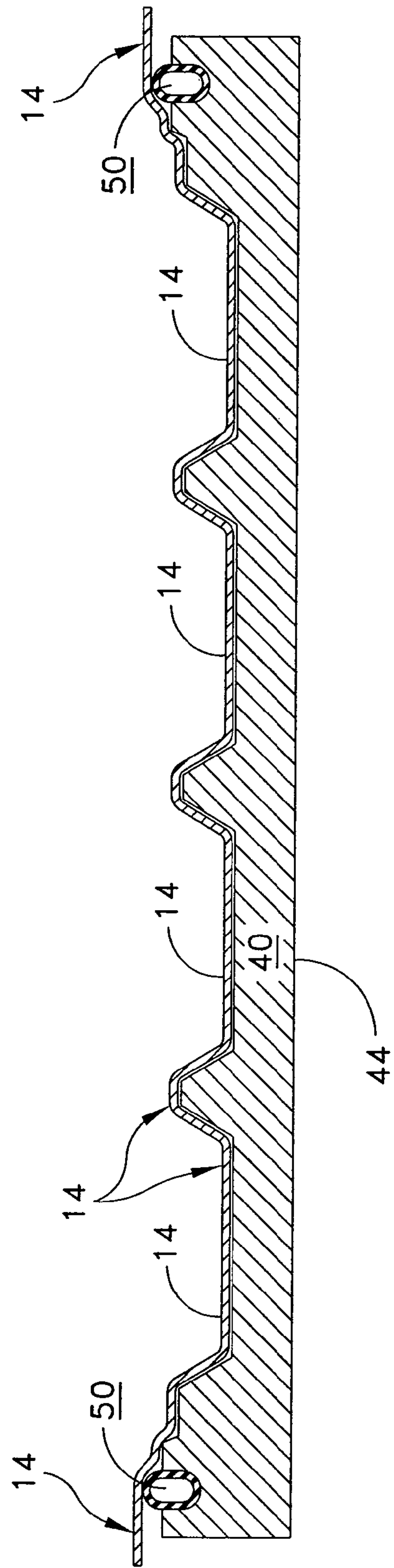
FIG. 11 shows the application of a barrier layer to the mold shown in FIG. 10.

As shown in FIG. 11, after selection of a suitable mold 40, the method can comprise disposing a barrier layer 14 onto the mold 40. Barrier layer 14 can be disposed onto mold 40 as a sheet of material, or as a coating applied directly onto the mold. When applied as a sheet, then barrier layer 14 can be applied onto the mold and in physical contact with the gasket 50. When applied as a sheet, then the barrier layer 14 also can comprise registration guides (e.g., holes, perforations, etc., and the like) corresponding to the registration guides 54 in the mold 40, in order to aid in its alignment to mold 40 and to subsequent layers. If barrier layer 14 is not disposed as a sheet, then it can be disposed directly onto upper surface 42 of mold 40. If desired, a release coating may be used to assist in releasing barrier layer 14 from upper surface 42 of mold 40.

Figure 12:
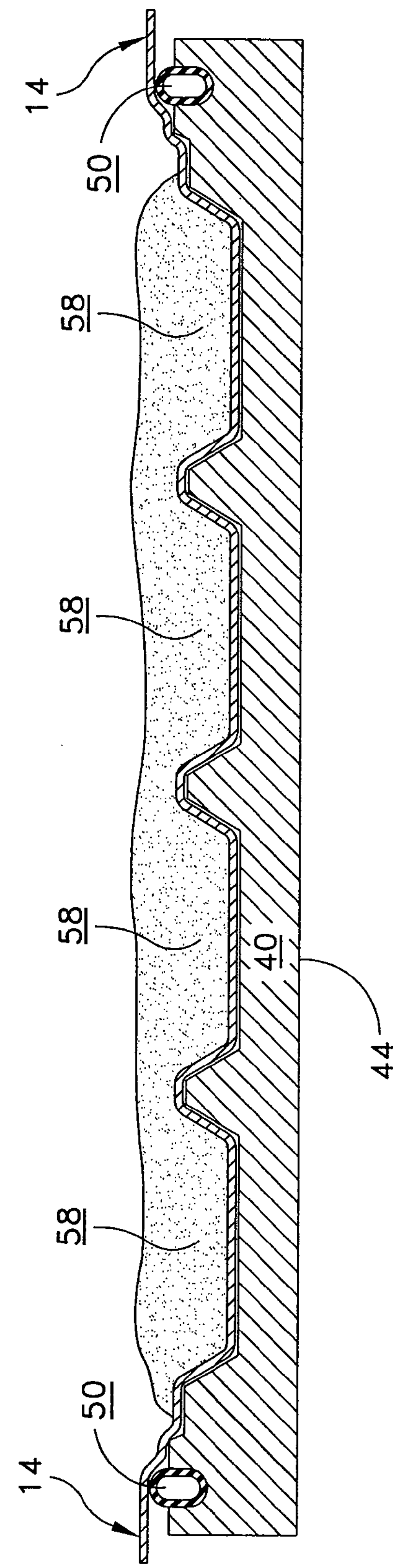
FIG. 12 shows the application of a gel precursor to the barrier layer shown in FIG. 11.

As shown in FIG. 12, after disposing barrier layer 14 onto upper surface 42 of mold 40, a gel precursor 58 can be dispensed onto barrier layer 14. "Gel precursor," as used herein, means a fluid material that has not yet cured to form a gel. Gel precursor 58 can be disposed onto barrier layer 14 using a variety of techniques such as, but not limited to, pouring, injecting, and/or the like.

Dispensing gel precursor 58 can comprise pouring a sufficient amount (e.g., volume) of the gel precursor to fill each of the individual mold units 48, rather than filling a single mold unit 48, as in other processes such as injection molding. For example, other methods, such as injection molding, may involve dispensing the gel precursor 58 separately to each mold unit 48. Therefore, using the present mold, multiple separate dispensing steps would be required. In contrast, the present method can comprise dispensing gel precursor 58 once onto the barrier layer 14 (e.g., a single "pour"), and the single dispensation of gel precursor 58 can provide a sufficient amount of gel precursor 58 to form all of the mold units 48 in a single molding cycle. Dispensing the gel precursor 58 in bulk, rather than separately, can substantially reduce the manufacturing time of the present method in comparison to other methods.

Figure 13:
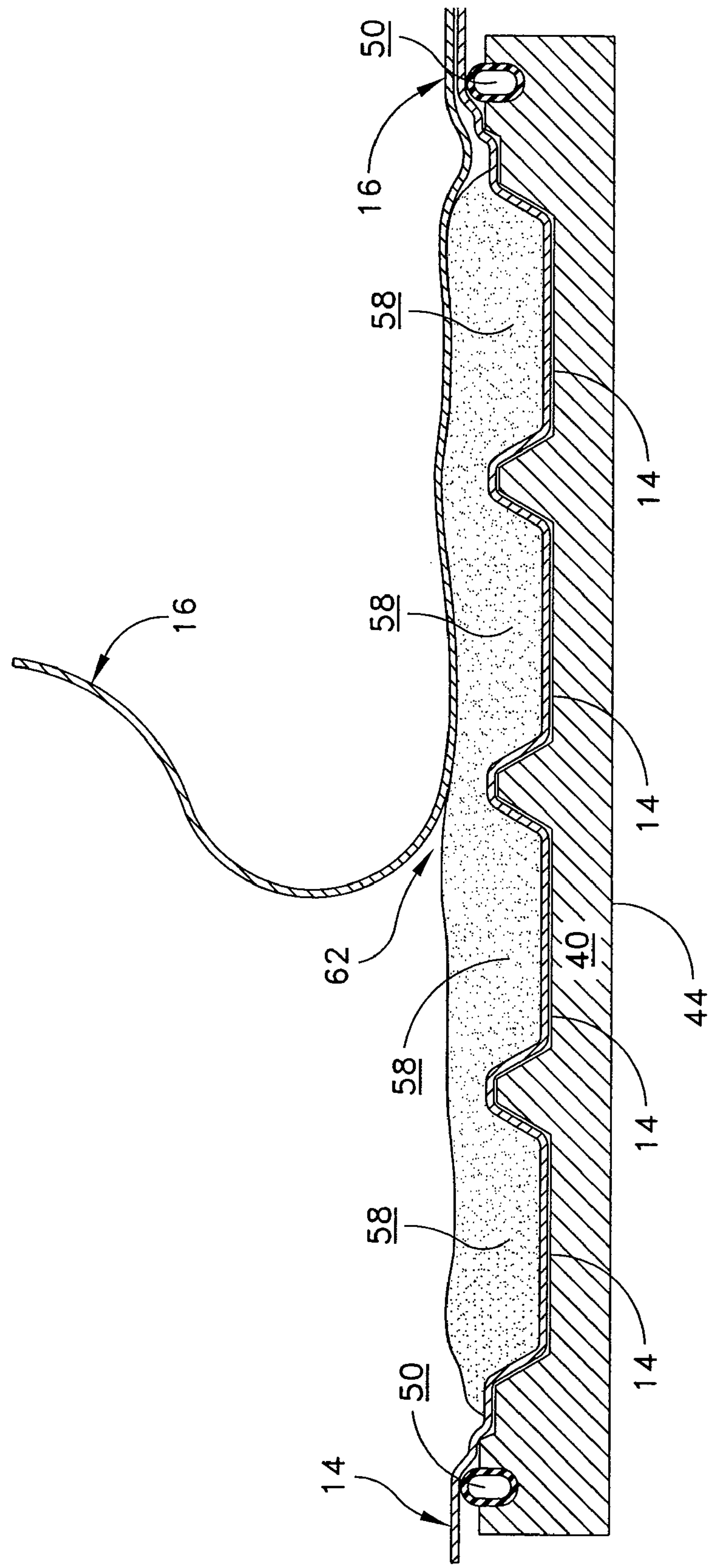
FIG. 13 shows the application of a stabilization layer to the gel precursor shown in FIG. 12.
Figure 14:
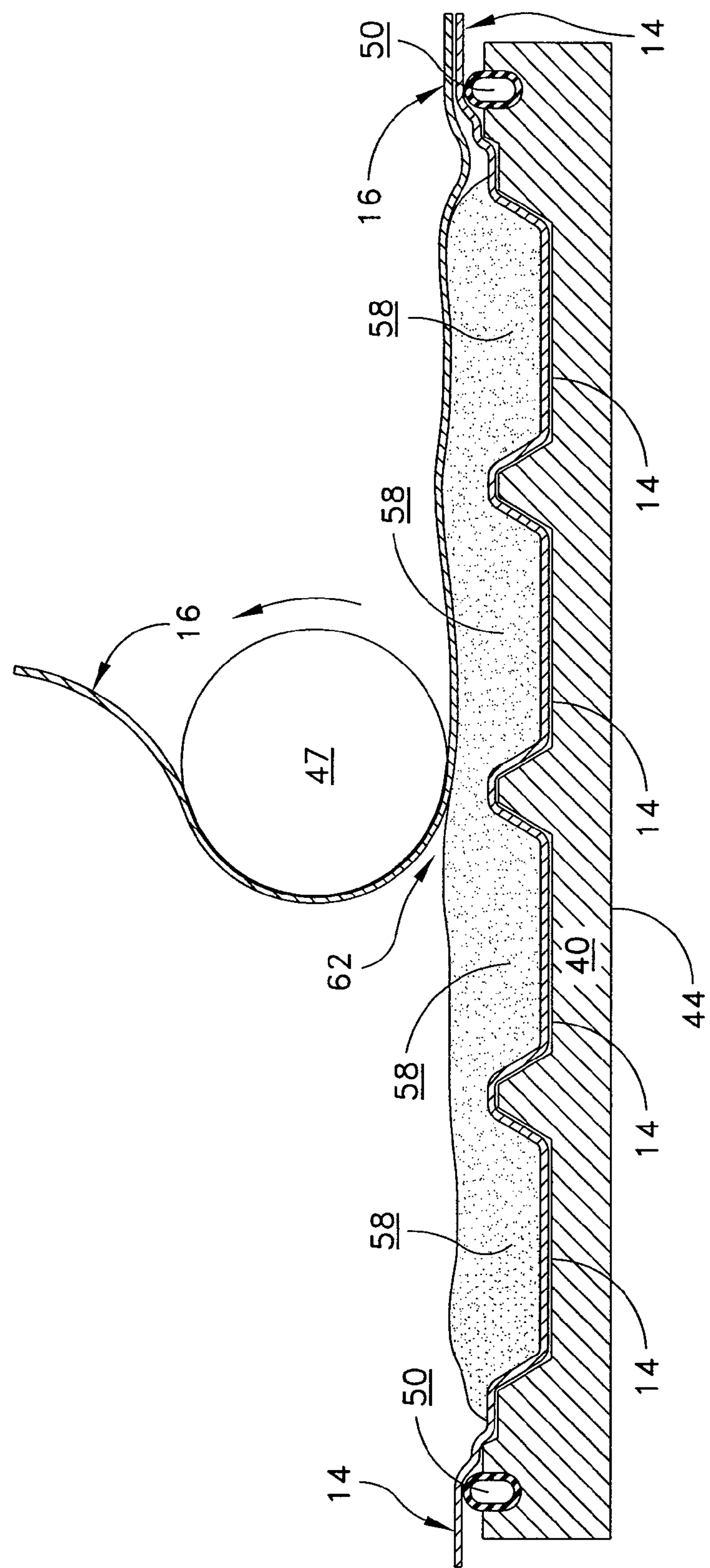
FIG. 14 shows the method of advancing the stabilization layer over the gel precursor shown in FIGS. 13 and 14.
Figure 15:
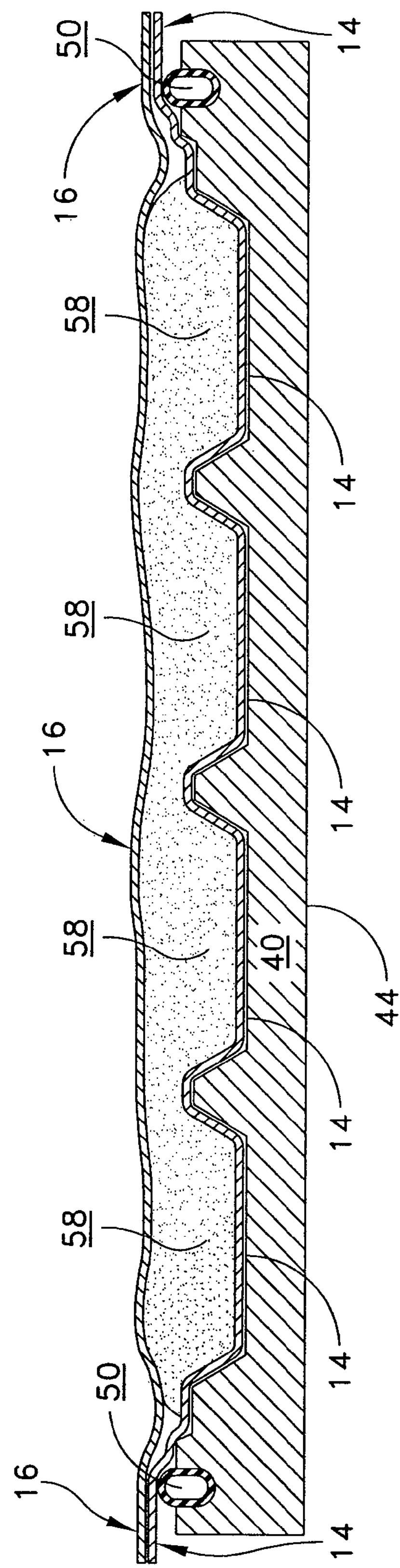
FIG. 15 shows the stabilization layer covering the gel precursor.

As shown in FIG. 13, after dispensing gel precursor 58 onto barrier layer 14, a stabilizing layer 16 can be disposed over gel precursor 58, for example, as a sheet. If mold 40 comprises registration guides 44, then stabilizing layer 16 also can comprise corresponding registration guides (not illustrated) to aid in its alignment to mold 40 and to any subsequent layers. Disposing stabilizing layer 16 onto the gel precursor can comprise disposing a portion of stabilizing layer 16 onto a portion of gel precursor 58 such that an interface 62 exists between gel precursor 58 and stabilizing layer 16. Disposing stabilizing layer 16 onto gel precursor 58 can be performed manually, with a tool such as a roller 47, as shown in FIG. 14, or the process can be automated. The remaining portion of stabilizing layer 16 can be advanced onto the remaining portion of gel precursor 58 by applying pressure to stabilizing layer 16 behind interface 62, and advancing interface 62 until stabilizing layer 16 covers the entire gel precursor 58, as shown in FIG. 15. The application of pressure while advancing stabilizing layer 16 substantially minimizes the formation of air bubbles between gel precursor 58 and stabilizing layer 16.

Figure 16:
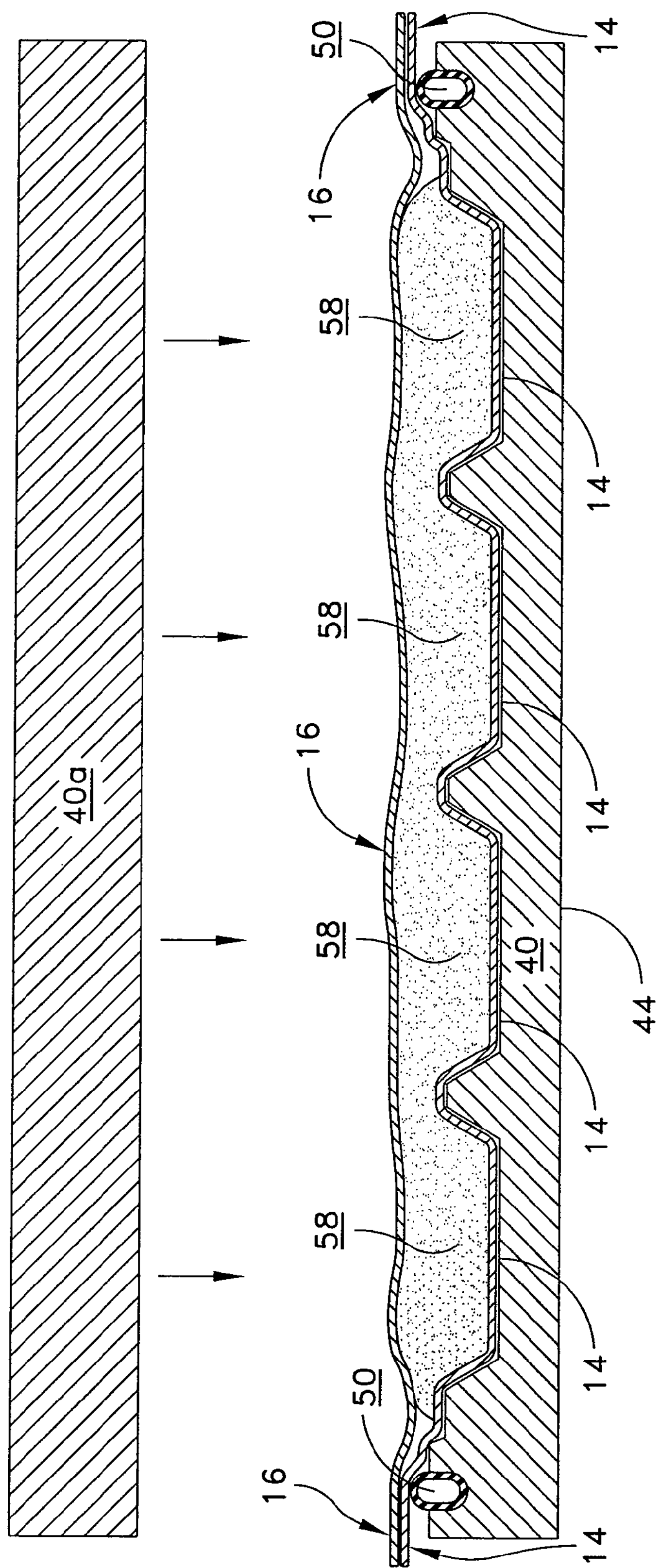
FIG. 16 shows the mold being closed.

As shown in FIG. 16, mold 40 can be closed, for example, by disposing a mold cover 40*a* over stabilizing layer 16. When mold 40 is closed, gel precursor 58 can flow into all regions of mold 40 defined by gasket 42, and any entrapped air can flow out of the mold through gasket openings 41.

Figure 17:
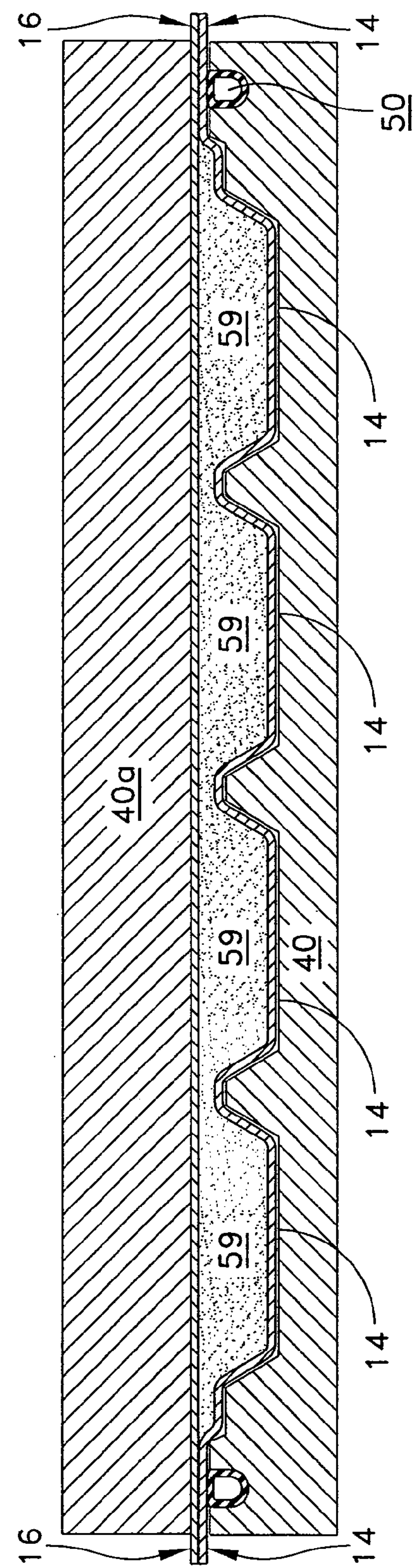
FIG. 17 shows the mold after closure and the polymerization of the gel precursor.

As shown in FIG. 17, gel precursor 58 can be allowed to form a polymerized gel 59 in the closed mold 40 for a predetermined period of time (e.g., 30 seconds to 5 minutes). If desired, pressure and/or a vacuum can be applied to the mold for various reasons e.g., to increase the speed of processing, to improve the quality of the final material, to change the surface characteristics of the polymerized gel, and/or the like. As a result, the overall processing time for producing a plurality of molded products 49 can be substantially reduced in comparison to other methods such as injection molding. In addition, because the time used to dispense the gel precursor 58 is reduced in comparison to other methods, it is possible to increase the speed of curing by varying a number of factors such as, for example, pressure, temperature, catalyst concentration (when used), and/or the like. The use of pressure and/or vacuum during the molding process can be desirable when the articles to be formed require more definition such as undercuts, and the like. When vacuum forming or thermoforming, it can be desirable to utilize molds formed at least in part from a porous composite material, which allows the formation of intricate details and surface patterns in the molded article, and eliminates the necessity for vent holes in the mold. One example of such a porous composite material is breathable aluminum, which is available commercially under the brand name METAPOR™.

Figure 18:
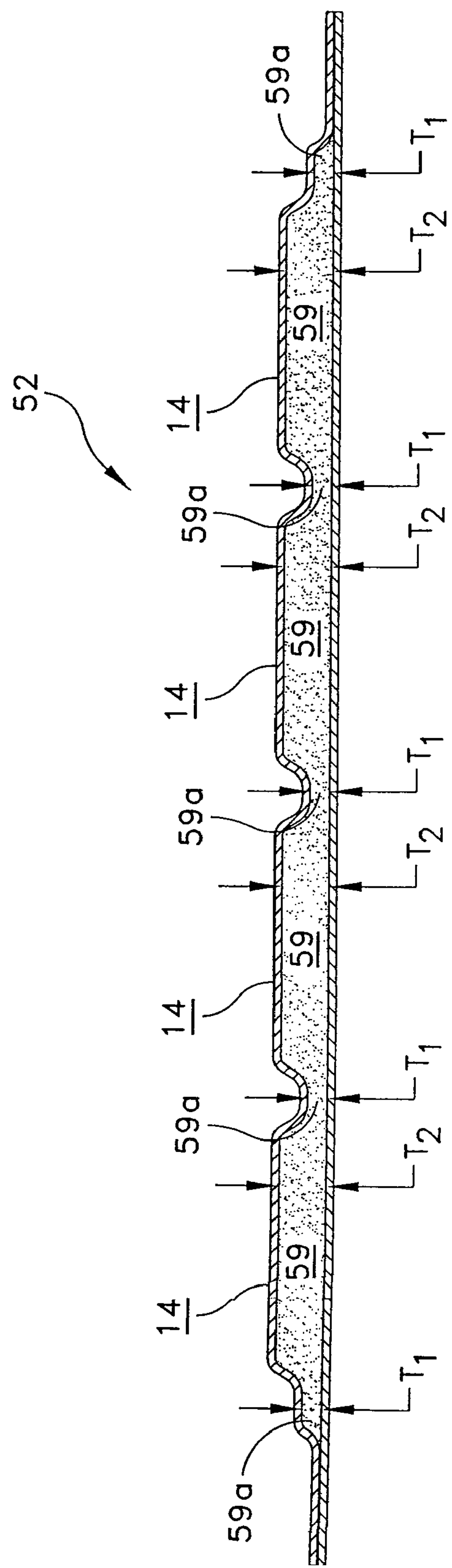
FIG. 18 shows a sheet of material containing a sheet of molded units interconnected by a layer of gel, after removal from the mold.

After curing, mold 40 can be opened, and a sheet 52 comprising the molded products 19 can be removed from the mold 40, as shown in FIG. 18. The presence of barrier layer 14 and stabilization layer 16 can facilitate the handling of the sheet 52 because the polymerized gel 59 is encapsulated by the layers 14, 16, which can be advantageous when the polymerized gel 59 has adhesive properties that would otherwise cause it to adhere to surfaces such as the mold surface, a user's hand, and the like. The sheet 52 comprises a plurality of relatively thin regions 59*a* of the polymerized gel 59 disposed between barrier layer 14 and stabilization layer 16, and interconnecting the molded products 10. The regions 59*a* of polymerized gel can comprise a thickness "$T_1$" corresponding to the depth $D_1$ of the recessed region 46 of mold 40. In order to minimize waste, the depth $D_1$ of the recessed region 46 can be selected to be as small as possible while still allowing unrestricted flow of the gel precursor 58 into the region defined by the gasket 50 Thus, the depth $D_1$ and thickness "$T_1$" of can be varied.

The molded products 10 can be separated from the sheet 52 and from each other by cutting (e.g., die cutting, and the like) through barrier layer 14, gel regions 59*a* and stabilization layer 16. The molded products 10 can be die cut between the gel regions 59 and 59*a* and/or through the gel region 59. When the polymerized gel 59 has adhesive properties, then it may be desirable to die cut through a portion of the polymerized gel regions 59 adjacent to the polymerized gel region 59*a*, such that the sides of the molded units 10 comprise an exposed region of polymerized gel. During die cutting, the presence of stabilization layer 16 prevents or minimizes the polymerized gel 59 and barrier layer 14 from shrinking, thereby substantially maintaining the dimensions of the molded products 10 in comparison to the dimension of the mold units 48. Because shrinkage of the molded products 10 can be minimized, it may not be necessary to factor shrinkage into the design of the molds, as may be necessary with other methods.

Optionally, a layer 18 of the same or different material can be disposed between any of the foregoing layers e.g., between stabilization layer 16 and the polymerized gel 59 and/or between the polymerized gel 59 and barrier layer 14. Also optionally, layer 18 can be disposed in the gel 59 e.g., by disposing a first portion of the gel precursor 58 onto barrier layer 14, disposing the layer 18 over the first portion of the gel precursor 58, and disposing a second portion of gel precursor 58 over the layer 18. Layer 18 can comprise a variety of synthetic and/or non-synthetic materials including, but not limited to, paper, fabric, plastic film, and/or the like, as well as composites and/or combinations comprising at least one of the foregoing. When layer 18 comprises a fabric layer, the fabric can be knit, woven, non-woven, synthetic, non-synthetic, and combinations comprising at least one of the foregoing. Disposing a fabric layer as layer 18 can be advantageous because it can trap and disperse air bubbles that may otherwise form in or between the layers, resulting in a better appearance for the final molded products 10. Layer 18 also can comprise color, graphics and/or indicia, including text. The color, graphics and/or indicia disposed on layer 18 can be transmitted through other layers when they are formed from colorless and/or transparent materials, which can be desirable for aesthetic and costs reasons. In addition, if desired, layer 18 can be fluid-permeable. "Fluid-permeable," as used herein, means that the material from which layer 18 is formed is open to passage or entrance of a fluid material, such as the gel precursor.

Also optionally, layer 18 can be used in place of stabilization layer 16. If layer 18 replaces stabilization layer 16, then it can be applied in the same manner described above with respect to stabilization layer 16.

As noted above, in some instances, it may be desirable to be able to adhere the molded products 10 to various surfaces.

Therefore, optionally, an adhesive (not illustrated) may be disposed on one or more surfaces of the final molded products 10, and/or on one or more surfaces of the individual layers 12, 14, 16, 18. Some possible adhesives can comprise pressure sensitive adhesives, thermoplastic adhesives, and the like, as well as combinations comprising at least one of the foregoing. One example of such a material is available from 3M as product number 7026.

In some instances, the polymerized gel 59 may comprise sufficient adhesive strength to be adhered to a surface in the absence of a separate adhesive. In such instances, it may be desirable that the stabilizing layer 16 can be capable of manual release from the polymerized gel 59. Therefore, optionally, stabilizing layer 16 can comprise a release coating (not illustrated) such as silicone, disposed on surface 16*a*, which can assist in the manual release of the stabilizing layer 16 from the polymerized gel 59.

A variety of materials can be used in the foregoing methods to make the foregoing molded products 10. Barrier layer 14 can comprise any material capable of providing sufficient elasticity to prevent tearing and/or stretching when a force is applied thereto; sufficient structural integrity to be formed into predetermined shapes; and that is capable of withstanding the environment in which it is intended to be used, without substantial degradation. Barrier layer 14 also can be selected to facilitate the handling of the polymerized gel layer, which can comprise adhesive characteristics in some instances. Therefore, after molding, barrier layer 14 can be selected to comprise a relatively non-tacky surface and a relatively smooth feel to the human touch. Some possible materials for barrier layer 14 include polyolefins, polystyrenes, PVC, latex rubber, and thermoplastic elastomers (TPEs), composite materials, fabric, leather, knit, woven, nonwoven, and/or the like, and combinations comprising at least one of the foregoing materials. Some possible TPE materials include polyurethane, silicone, and/or the like, and combinations comprising at least one of the foregoing materials. Some possible composite materials include combinations of textile materials, leather, and TPE films. Barrier layer 14 can comprise an elongation of about 100 percent (%) to about 1500%, more particularly about 200% to about 1000%, and more particularly still about 300% to about 700%". It should be understood that the modifier "about" used in connection with a quantity is inclusive of the stated value and has the meaning dictated by the context (e.g., includes the degree of error associated with measurement of the particular quantity).

Barrier layer 14 can comprise any thickness. For practical purposes it has been found that thinner layers can provide improved hand-feel, while thicker layers can provide increased durability. Therefore, it can be desirable to use the thinnest barrier layer possible in order to prevent punctures in barrier layer 14. When the polymerized layer 59 is tacky, puncturing barrier layer 14 can expose the underlying tacky material of the polymerized gel 59, making it difficult to handle. Barrier layer 14 can comprise a thickness ranging from about 0.2 milli-inch (hereinafter "mil") to about 5 mil, more particularly from about 0.5 mil to about 3 mil, and more particularly still from about 0.6 mil to about 2 mil.

As noted above, barrier layer 14 can be applied as a sheet of material during the molding process. In the form of a sheet, and especially when the barrier layer is relatively thin, the barrier material can be very flexible and may wrinkle and/or fold very easily during handling. Therefore, barrier layer 14 also can comprise a support layer (not illustrated), which assists in handling the material. If the barrier layer 14 comprises such a supporting layer, then the supporting layer can be disposed adjacent to the upper surface 42 of the mold 40, with the barrier layer material facing away from the upper surface 42, which can be removed prior to die cutting, if desired or necessary.

Also as noted above, if barrier layer 14 is not applied as a sheet, then it can be applied as a coating of material during or after the molding process. If applied after the molding process, then the barrier layer can be disposed onto the gel 58 after formation of the molded units 10, for example by painting, spraying, brushing manually, and/or the like. When barrier layer 14 is not disposed as a sheet or is not disposed as a coating during the molding process, and then the gel precursor 58 can be disposed directly onto the upper surface 42 of mold 40, which may require the use of a release agent on the upper surface 42.

The gel 59, 59*a* can comprise any polymeric material comprising sufficient structural integrity to be formed into predetermined shapes, including foam polymeric materials; and that is capable of withstanding the environment in which it is intended to be used, without substantial degradation. The hardness of the material (e.g., the gel materials) can be selected to provide articles and/or regions of articles with a predetermined hardness, which can be tailored for specific cushioning and/or wear resistance applications. The gel 59, 59*a* can comprise a durometer ranging from about 30 Shore 000 to about 88 Shore D. The durometer of the gel can be determined using a tool such as a durometer.

Examples of suitable polymeric materials include, but are not limited to, thermosetting polymeric materials, elastomeric polymeric materials, thermoplastic materials, including thermoplastic elastomeric materials, and combinations comprising at least one of the foregoing. Some possible polymeric materials include, but are not limited to, polyurethane, silicone, and/or the like, and combinations comprising at least one of the foregoing materials. Examples of other materials include, but are not limited to, composite materials, and the like.

Formation of the gel precursor 58 can take place by a variety of methods known to those of skill in the art. For example, formation of a polyurethane gel can comprise reacting suitable pre-polymeric precursor materials e.g., reacting a polyol and an isocyanate in the presence of a catalyst.

In some instances, it can be desirable for the gel to be sufficient softness and/or pliability to provide comfort against a body. In such instances, gel can comprise a durometer ranging from about 0.01 Shore 00 to less than or equal to about 70 Shore A, more particularly less than 70 Shore 00, more particularly still less than 60 Shore 00.

In some embodiments, it can be desirable for the gel to have sufficient adhesive strength to adhere to a selected surface (such as the outer surface of a bicycle seat) which can eliminate the need for a separate adhesive to adhere the molded units to a desired surface. It is possible to vary the adhesive strength of the gel by varying, for example, the durometer of the material used to form the layer. In such instances, the polymerized gel can comprise, for example, a durometer of about 30 Shore 000 to about 85 Shore 00. Gel materials in such relatively low durometer ranges can comprise a jelly-like consistency. One possible material having such adhesive characteristics is a polyurethane gel comprising a durometer in the range of about 70 Shore 00 to about 85 Shore 00, which can provide sufficient adhesive strength to adhere to a desired surface, such as the surface of a bicycle seat, or a rigid plastic such a polypropylene.

Again, although illustrated herein as a gel, other materials can be used to form layers and/or regions 59, 59*a* such as, for example, composite materials.

The gel 59 and/or the barrier layer 14 can comprise one or more additives such as, but not limited to, modifiers, coloring agents, stabilizers, phase changing materials, ultraviolet inhibitors, and/or active agents as well as combinations comprising at least one of the foregoing. The concentration of the additive can be varied depending on the desired effectiveness of the agent.

One possible phase changing material can comprise phase changing microspheres (available under the product name Outlast), which contain materials that can change phases at near body temperature. As a result, heat energy can be stored in the barrier layer, resulting in a product that can feel cool or warm.

Suitable active agents can comprise tolnaftate, undecenoic acid, allylamines, chlorine, copper, baking soda, sodium omadine, zinc omadine, azoles, silver, copper, zinc, and/or the like, and combinations comprising at least one of the foregoing. For example, silver can provide an antifungal/antibacterial effect. For purposes of economy and effectiveness, it has been found advantageous to include active agents, when used, in barrier layer 14. Because barrier layer 14 is relatively thin in comparison to gel layer 59, disposing such agents in barrier layer 14 allows the use of reduced total amounts of the agents to achieve similar effective concentrations in comparison to thicker layers, thereby reducing costs associated with the additives. Also, disposing such agents in the barrier layer 14 ensures that the agents are disposed in the outermost layer of the article i.e., the body contacting regions, rather than in regions remote from the user, which can increase the effectiveness of the agents.

In some instances, it may be desirable to use colorless materials for each of the barrier, polymerized gel and stabilization layers, which can be desirable for aesthetic reasons. For example, it can be desirable to use colorless cushioning medallions. In another embodiment, when layer 18 is included in the structure, and the layer includes color, graphics and/or indicia, it can also be desirable to use colorless and/or transparent materials because the color, graphics and/or indicia will be visible through the layers.

Stabilizing layer 16 can comprise a material that is capable of substantially minimizing shrinkage of barrier layer 14, gel precursor 58 and/or the gel 59 during and after processing; that can provide support for the gel 59; and that is capable of facilitating handling of gel 59 and barrier layer 14. Stabilizing layer 16 can comprise any material that is substantially inelastic in comparison to gel 59, in order to be capable of providing dimensional stability to sheet 52 and/or to the molded products 10 during and after processing. Some possible materials for stabilizing layer 16 include, but are not limited to, fabrics, paper, plastic (e.g., polyester, polyethylene, polyvinyl chloride (PVC), and the like) metal, metallized plastic, and/or the like, and combinations comprising at least one of the foregoing materials. One possible material is oriented polyester film, which is commercially available from a variety of sources and a under variety of different product names (e.g., Mylar®). Stabilizing layer 16 can comprise a thickness ranging from about 0.2 mil to about 10 mil, more particularly from about 0.5 mil to about 5 mil, and more particularly still from about 1 mil to about 2 mil.

The foregoing methods and materials can facilitate the manufacture of polymeric articles and/or regions of articles, which can be desirable for aesthetics and/or to minimize wear and/or friction. The methods can be used to form polymeric articles and/or regions of articles, comprising any size, thickness or geometry. The size, thickness, geometry, softness, and adhesive strength of the articles and/or portions of the articles can be selected to optimize the conditions for which it is designed. Examples of articles in which the foregoing polymeric materials can be useful include, but are not limited to, handles for personal care objects such as hairbrushes, toothbrushes and razors; medical devices such as masks, crutches and casts; handles for household objects such as brooms; straps for luggage, backpacks, briefcases and purses; clothing such as cycling shorts, undergarments and shoes; utility objects such as mousepads, keyboard rests; handles and/or straps for consumer goods such as bottles and/or boxes, laundry detergent handles; sporting goods equipment and accessories such as racquet grips, bat handles, fishing rod grips, guns, and bicycle handlebar grips; and the like. In addition, the articles can comprise indicia such as labels with color, text and/or graphics, and the like.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A bicycle seat cushioning medallion comprising:

a first cushioning medallion and a second cushioning medallion constructed and arranged to be disposed in spaced apart relation on the bicycle seat;

a third cushioning medallion disposed over the first cushioning medallion;

each of the first, second and third cushioning medallions comprising a thermoplastic elastomeric (TPE) barrier layer, a polymerized gel layer, a removable stabilizing layer disposed adjacent to the polymerized gel layer and opposite the barrier layer, and a pressure sensitive adhesive (PSA) disposed between the polymerized gel layer and the stabilizing layer;

wherein the polymeric gel of the third cushioning medallion is adhered to an upper surface of the barrier layer of the first cushioning medallion.

2. The bicycle seat cushioning medallion of claim 1, wherein the TPE barrier layer is selected from the group consisting of thermoplastic polyurethane (TPU), silicone, and combinations comprising at least one of the foregoing.

3. The bicycle seat cushioning medallion of claim 1, wherein the barrier layer comprises a support layer, and the TPE is disposed on the support layer, adjacent to the polymerized gel.

4. The bicycle seat cushioning medallion of claim 1, wherein the PSA is disposed on a support layer.

5. The bicycle seat cushioning medallion of claim 4, wherein the support layer is TPU.

6. The bicycle seat cushioning medallion of claim 1, comprising a release agent disposed on a surface of the stabilizing layer adjacent to the PSA.

7. The bicycle seat cushioning medallion of claim 1, wherein the polymerized gel layer comprises a thermoplastic polyurethane.

8. The bicycle seat cushioning medallion of claim 1, further comprising an active agent disposed in the barrier layer.

9. The bicycle seat cushioning medallion of claim 8, wherein the active agent is selected from the group consisting of silver, tolnaftate, undecenoic acid, allylamines, chlorine, copper, baking soda, sodium omadine, zinc omadine, azoles, and combinations comprising at least one of the foregoing.

10. The bicycle seat cushioning medallion of claim 1, wherein the polymerized gel layer comprises a hardness ranging from about 30 Shore 000 to about 75 Shore 00.

11. The bicycle seat cushioning medallion of claim 1, further comprising a fourth cushioning medallion disposed over the second cushioning medallion, wherein the polymeric gel of the fourth cushioning medallion is adhered to an upper surface of the barrier layer of the second cushioning medallion.

* * * * *